US012190124B2

United States Patent
Ma et al.

(10) Patent No.: US 12,190,124 B2
(45) Date of Patent: Jan. 7, 2025

(54) METHOD FOR DETERMINING CONFIGURATION PARAMETERS OF DATA PROCESSING DEVICE, ELECTRONIC DEVICE AND STORAGE MEDIUM

(71) Applicant: SHENZHEN MICROBT ELECTRONICS TECHNOLOGY CO., LTD., Guangdong (CN)

(72) Inventors: Weibin Ma, Guangdong (CN); Lihong Huang, Guangdong (CN); Haifeng Guo, Guangdong (CN); Zuoxing Yang, Guangdong (CN)

(73) Assignee: SHENZHEN MICROBT ELECTRONICS TECHNOLOGY CO., LTD., Shenzhen (CN)

( * ) Notice: Subject to any disclaimer, the term of this patent is extended or adjusted under 35 U.S.C. 154(b) by 28 days.

(21) Appl. No.: 18/005,535

(22) PCT Filed: Jun. 2, 2021

(86) PCT No.: PCT/CN2021/097822
§ 371 (c)(1),
(2) Date: Jan. 13, 2023

(87) PCT Pub. No.: WO2022/110743
PCT Pub. Date: Jun. 2, 2022

(65) Prior Publication Data
US 2023/0289196 A1    Sep. 14, 2023

(30) Foreign Application Priority Data

Nov. 27, 2020  (CN) .......................... 202011353553.7

(51) Int. Cl.
*G06F 9/24*    (2006.01)
*G06F 9/445*   (2018.01)
(Continued)

(52) U.S. Cl.
CPC ......... *G06F 9/44505* (2013.01); *G06N 20/00* (2019.01); *G06F 9/4401* (2013.01)

(58) Field of Classification Search
CPC .... G06F 9/44505; G06F 9/5027; G06F 1/206; G06F 1/266; G06N 20/00; Y02D 10/00
(Continued)

(56) References Cited

U.S. PATENT DOCUMENTS 11,428,766 B2 *  8/2022 Leussler .............. G01R 33/543
11,509,542 B2 * 11/2022 Shirazipour ........... G06N 3/086
(Continued)

FOREIGN PATENT DOCUMENTS

CN    108733540 A  * 11/2018    .......... G06F 11/3062
CN    109812927 A     5/2019
(Continued)

OTHER PUBLICATIONS

International Search Report mailed Aug. 30, 2021 in International Application No. PCT/CN2021/097822.

*Primary Examiner* — Volvick Derose
(74) *Attorney, Agent, or Firm* — Venable LLP

(57) ABSTRACT

Disclosed is a method for determining configuration parameters of a data processing device, including: operating the data processing device by using configuration parameters, which are universal optimization configuration parameters obtained according to a universal operating parameter model; during the operating process, changing the configuration parameters to obtain a dedicated operating parameter data set, which includes a plurality of groups of operating parameters, each of which includes configuration parameters and capability parameters of the data processing device when the data processing device is operating under the configuration parameters; executing model training by using the dedicated operating parameter data set to obtain a (Continued)

dedicated operating parameter model; and obtaining optimal configuration parameters according to the dedicated operating parameter model, and operating the data processing device according to the optimal configuration parameters, where the optimal configuration parameters are configuration parameters corresponding to optimal capability parameters in the dedicated operating parameter data set.

9 Claims, 1 Drawing Sheet

(51) Int. Cl.
    *G06N 20/00*     (2019.01)
    *G06F 9/4401*     (2018.01)

(58) Field of Classification Search
    USPC .......................................................... 713/1
    See application file for complete search history.

(56) References Cited

U.S. PATENT DOCUMENTS

| | | | |
|---|---|---|---|
| 2011/0283235 A1* | 11/2011 | Kling | G06F 1/3234 |
| | | | 715/833 |
| 2016/0110657 A1* | 4/2016 | Gibiansky | G06N 20/00 |
| | | | 706/12 |
| 2018/0104500 A1* | 4/2018 | Blum | A61N 1/36125 |
| 2018/0239987 A1* | 8/2018 | Chen | G06V 10/764 |
| 2019/0227814 A1* | 7/2019 | Bregman | G06F 9/48 |
| 2019/0325307 A1* | 10/2019 | Li | G06N 3/08 |
| 2020/0090073 A1* | 3/2020 | Zhan | G06N 20/00 |
| 2020/0142466 A1* | 5/2020 | Naik | G06N 3/045 |
| 2020/0272771 A1* | 8/2020 | Yoshikawa | G06F 30/367 |
| 2022/0207401 A1* | 6/2022 | Ito | G06N 20/10 |
| 2022/0238318 A1* | 7/2022 | Ishikawa | H01J 49/0031 |
| 2022/0295311 A1* | 9/2022 | Chuai | H04W 24/02 |
| 2023/0176639 A1* | 6/2023 | Ma | G06F 1/266 |
| | | | 713/340 |
| 2023/0254709 A1* | 8/2023 | Dey | G06N 3/08 |
| | | | 370/328 |
| 2024/0098496 A1* | 3/2024 | Marzban | H04L 41/16 |

FOREIGN PATENT DOCUMENTS

| | | |
|---|---|---|
| CN | 110390387 A | 10/2019 |
| CN | 111811110 A | 10/2020 |
| CN | 111966202 A | 11/2020 |
| CN | 112506649 A | 3/2021 |

* cited by examiner

METHOD FOR DETERMINING CONFIGURATION PARAMETERS OF DATA PROCESSING DEVICE, ELECTRONIC DEVICE AND STORAGE MEDIUM

CROSS-REFERENCE TO RELATED APPLICATIONS

The present application is a National Stage Entry of International application No. PCT/CN2021/097822 filed on Jun. 2, 2021, which claims priority to Chinese Patent Application No. 202011353553.7, entitled "METHOD FOR DETERMINING CONFIGURATION PARAMETERS OF MINING MACHINE" filed with the China National Intellectual Property Administration on Nov. 27, 2020, which is incorporated herein by reference in its entirety.

TECHNICAL FIELD

This application relates to the technical field of virtual currency, and in particular, to a method for determining configuration parameters of a data processing device, an electronic device, and a storage medium.

BACKGROUND

In a virtual currency mining machine, all hash chips perform mining in a fixed frequency mode. For the hash chips, different working frequency points of the hash chips can be determined according to different voltages and different temperatures. Meanwhile, in a mining machine, there are temperature differences and voltage differences between the hash chips in different positions. Therefore, if a same frequency is set for the hash chips in different positions in the mining machine, capabilities of most hash chips cannot be fully utilized, resulting in a waste of the computing power of the mining machine.

Therefore, how to avoid the waste of the computing power of the mining machine and improve the total computing power of the mining machine has become an urgent problem to be solved.

SUMMARY

In view of this, this application provides a method for determining configuration parameters of a data processing device, an electronic device, and a storage medium. Optimal configuration parameters achieving an optimal computing power of the data processing device are obtained through model training, to avoid a waste of the computing power of the data processing device and improve a total computing power of the data processing device.

Technical solutions of this application are implemented as follows:

A method for determining configuration parameters of a data processing device, comprising:
operating the data processing device by using configuration parameters, wherein the configuration parameters are universal optimization configuration parameters obtained according to a universal operating parameter model;
during the operating process of the data processing device, changing the configuration parameters of the data processing device to obtain a dedicated operating parameter data set of the data processing device, wherein the dedicated operating parameter data set comprises a plurality of groups of operating parameters, and each group of operating parameters comprises configuration parameters and capability parameters of the data processing device when the data processing device is operating under the configuration parameters;
executing model training by using the dedicated operating parameter data set to obtain a dedicated operating parameter model with regard to the data processing device; and
obtaining optimal configuration parameters of the data processing device according to the dedicated operating parameter model and operating the data processing device according to the optimal configuration parameters, wherein the optimal configuration parameters are configuration parameters corresponding to optimal capability parameters in the dedicated operating parameter data set.

Further, the configuration parameters comprise: a frequency of each hash chip, a temperature of a hashboard, and a power supply output voltage of the data processing device.

Further, said changing the configuration parameters of the data processing device to obtain the dedicated operating parameter data set of the data processing device comprises:
changing the frequency of the each hash chip, the temperature of the hashboard, and/or the power supply output voltage of the data processing device, to obtain capability parameters of the data processing device under different configuration parameters, forming the operating parameters with the configuration parameters and the capability parameters of the data processing device corresponding to the configuration parameters, and forming the dedicated operating parameter data set of the data processing device with the plurality of groups of operating parameters.

Further, the capability parameters of the data processing device comprise: computing power of the data processing device and power of the data processing device.

Further, said obtaining the optimal configuration parameters of the data processing device according to the dedicated operating parameter model for the data processing device comprises:
by using the dedicated operating parameter model for the data processing device, traversing values of the configuration parameters to obtain the configuration parameters corresponding to the optimal capability parameters in the dedicated operating parameter data set, and taking the configuration parameters corresponding to the optimal capability parameters as the optimal configuration parameters of the data processing device.

Further, the method for determining configuration parameters of the data processing device further comprising:
obtaining the universal optimization configuration parameters by using the universal operating parameter model for the data processing device.

Further, the universal operating parameter model is obtained by using the following method:
forming operating parameters of a plurality of data processing devices into a universal operating parameter data set; and
executing model training by using the universal operating parameter data set, to obtain the universal operating parameter model, wherein
the operating parameters comprise configuration parameters of each data processing device and capability parameters of the data processing device when the data processing device is operating under the configuration parameters.

Further, said obtaining the universal optimization configuration parameters by using the universal operating parameter model comprises:

by using the universal operating parameter model, traversing values of the configuration parameters in the universal operating parameter model to obtain the configuration parameters corresponding to the optimal capability parameters in the universal operating parameter model, and taking the configuration parameters corresponding to the optimal capability parameters as the universal optimization configuration parameters of the data processing device.

A non-volatile computer-readable storage medium, storing instructions, wherein the instructions, when executed by a processor, cause the processor to perform the steps of the method for determining configuration parameters of a data processing device according to any item described above.

An electronic device, comprising:
at least one processor; and
a memory communicatively connected to the at least one processor, wherein
the memory stores instructions executable by the at least one processor, and the instructions are executed by the at least one processor, to cause the at least one processor to perform the steps of the method for determining configuration parameters of a data processing device according to any item described above.

It can be seen from the above solutions that in the method for determining configuration parameters of the data processing device of this application, the data processing device is operated first by using universal optimization configuration parameters of the data processing device, so that the data processing device can operate around the configuration parameters with computing power close to the optimal computing power. Based on this, during the operating process of the data processing device, the configuration parameters of the data processing device are changed to obtain a dedicated operating parameter data set of the data processing device, to obtain the dedicated data set that is applicable to the data processing device itself and can be used for model training. Based on this, the dedicated operating parameter model applicable to the data processing device itself can be obtained by using the dedicated operating parameter data set of the data processing device to execute model training. The optimal configuration parameters targeted at the data processing device itself can be obtained by using the dedicated operating parameter model. In this application, the data set and the model training are used to obtain the optimal configuration parameters targeted at the data processing device itself and capable of realizing the optimal computing power, thereby realizing adaptive learning of the optimal configuration parameters of the data processing device, effectively avoiding a waste of the computing power of the data processing device, and improving the total computing power of the data processing device.

DETAILED DESCRIPTION

To make the objectives, technical solutions, and advantages of this application clearer and more comprehensible, the following further describes this application in detail with reference to the accompanying drawings and embodiments.

Figure 1:
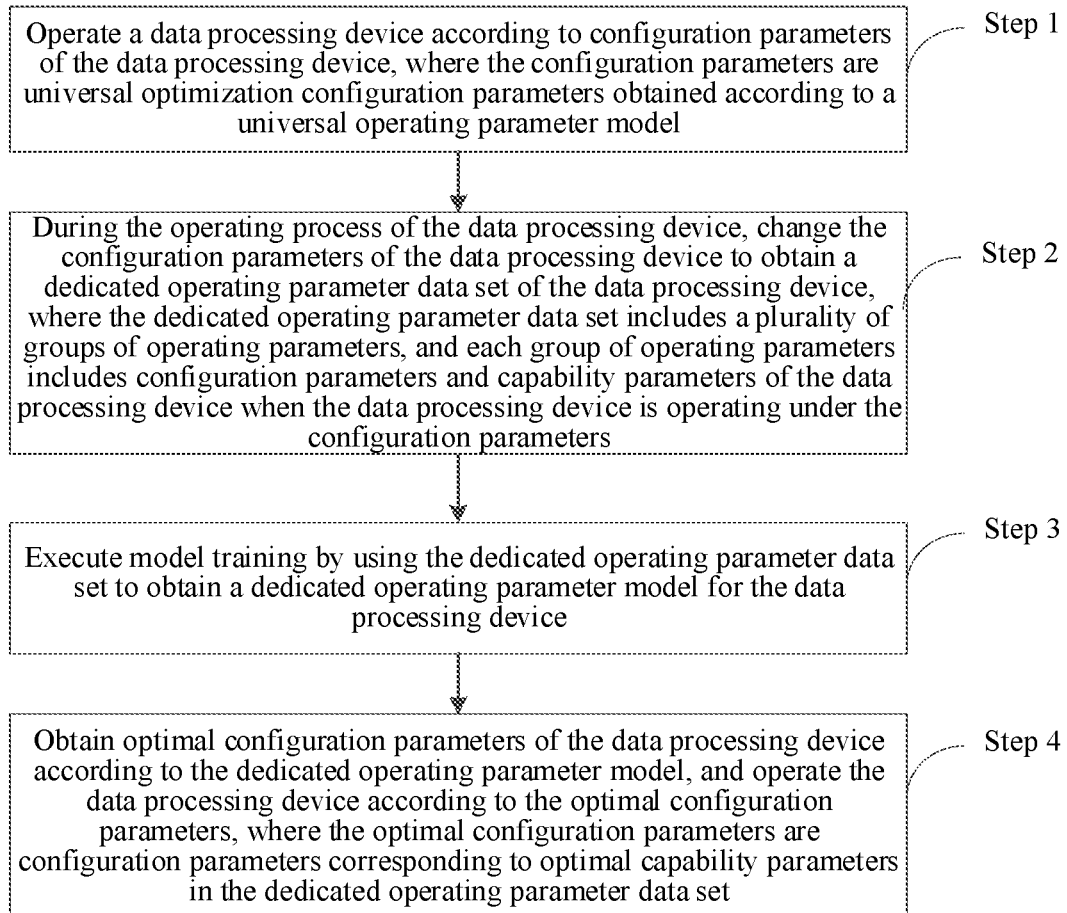
FIG. 1 is a flowchart of a method for determining configuration parameters of a data processing device according to an embodiment of this application.

As shown in FIG. 1, a determination method for configuration parameters of a data processing device according to an embodiment of this application includes the following steps:

Step 1. Operate the data processing device according to configuration parameters of the data processing device, where the configuration parameters are universal optimization configuration parameters obtained according to a universal operating parameter model;

Step 2. During the operating process of the data processing device, change the configuration parameters of the data processing device to obtain a dedicated operating parameter data set of the data processing device, where the dedicated operating parameter data set includes a plurality of groups of operating parameters, and each group of operating parameters includes configuration parameters and capability parameters of the data processing device when the data processing device is operating under the configuration parameters;

Step 3. Execute model training by using the dedicated operating parameter data set to obtain a dedicated operating parameter model for the data processing device; and Step 4. Obtain optimal configuration parameters of the data processing device according to the dedicated operating parameter model, and operate the data processing device according to the optimal configuration parameters, where the optimal configuration parameters are configuration parameters corresponding to optimal capability parameters in the dedicated operating parameter data set.

In this embodiment of this application, the configuration parameters include: a frequency of each hash chip, a temperature of a hashboard, and a power supply output voltage of the data processing device. The operating parameters include: the configuration parameters and capability parameters of the data processing device when the data processing device is operating under the configuration parameters.

The capability parameters include: computing power of the data processing device and power of the data processing device.

The temperature of the hashboard can be indirectly adjusted by a rotational speed of a heat dissipation fan of the data processing device or a temperature and a flow rate of a cooling liquid of a liquid cooling device.

In some embodiments, the dedicated operating parameter data set of the data processing device is composed of the plurality of groups of operating parameters of the data processing device.

In some embodiments, the changing the configuration parameters of the data processing device to obtain a dedicated operating parameter data set of the data processing device in step 2 includes:

changing the frequency of the each hash chip, the temperature of the hashboard, and/or the power supply output voltage of the data processing device, to obtain capability parameters of the data processing device under different configuration parameters, forming the operating parameters with the configuration parameters and the capability parameters corresponding to the configuration parameters and forming the dedicated operating parameter data set of the data processing device with the plurality of groups of operating parameters.

In some embodiments, the obtaining the optimal configuration parameters of the data processing device according to the dedicated operating parameter model for the data processing device in step 4 includes:

by using the dedicated operating parameter model, traversing values of the configuration parameters to obtain the configuration parameters corresponding to the optimal capability parameters in the dedicated operating parameter data set, and taking the configuration parameters corresponding to the optimal capability parameters as the optimal configuration parameters of the data processing device.

In some embodiments, using the data processing device being a mining machine as an example, it is assumed that, a mining machine includes 100 hash chips, where the frequency of the each hash chip, the temperature of the hashboard, and/or the power supply output voltage of the mining machine are changed to obtain the capability parameters of the mining machine under different configuration parameters, that is, the frequency of the each hash chip of the 100 hash chips, the temperature of the hashboard, and/or the power supply output voltage are changed. For details of the dedicated operating parameter data set of the mining machine, refer to Table 1.

corresponding parameter, for example, $f_{100n3}$ represents an $n3^{th}$ value of the frequency of the $100^{th}$ hash chip, and $S_{n6}$ represents an $n6^{th}$ value of the computing power of the mining machine. In the dedicated operating parameter data set of the mining machine, there are differences between the operating parameters of the mining machine. Model training can be performed by using the dedicated operating parameter data set, the model training can be implemented by using an artificial intelligence technology, and details are not described herein again.

The dedicated operating parameter model targeted at the mining machine itself can be obtained after the model training, and corresponding capability parameters (the computing power of the mining machine and the power of the mining machine) can be obtained by traversing various value combinations of the frequency of the each hash chip of the 100 hash chips, the temperature of the hashboard, and the power supply output voltage through the dedicated operating parameter model, to select optimal configuration parameters meeting an optimal condition of the capability parameters (the computing power of the mining machine and the power of the mining machine) from the obtained capability parameters, that is, an optimal combination of the frequency of the each hash chip, the temperature of the hashboard, and the power supply output voltage.

In some embodiments, the method for determining configuration parameters of the data processing device according to this embodiment of this application further includes the following steps performed before step 1:

TABLE 1

| Frequency of a first hash chip | Frequency of a second hash chip | | Frequency of a $100^{th}$ hash chip | Temperature of a hashboard | Power supply output voltage | Capability parameter | |
|---|---|---|---|---|---|---|---|
| | | | | | | Computing power | Power |
| $f_{11}$ | $f_{21}$ | ... | $f_{1001}$ | $T_1$ | $U_1$ | $S_1$ | $P_1$ |
| $f_{12}$ | $f_{21}$ | ... | $f_{1001}$ | $T_1$ | $U_1$ | $S_2$ | $P_2$ |
| $f_{12}$ | $f_{22}$ | ... | $f_{1001}$ | $T_1$ | $U_1$ | $S_3$ | $P_3$ |
| ... | ... | ... | ... | ... | ... | ... | ... |
| $f_{12}$ | $f_{22}$ | ... | $f_{1002}$ | $T_1$ | $U_1$ | $S_i$ | $P_i$ |
| $f_{12}$ | $f_{22}$ | ... | $f_{1002}$ | $T_2$ | $U_1$ | $S_{i+1}$ | $P_{i+1}$ |
| $f_{12}$ | $f_{22}$ | ... | $f_{1002}$ | $T_2$ | $U_2$ | $S_{i+2}$ | $P_{i+2}$ |
| ... | ... | ... | ... | ... | ... | ... | ... |
| $f_{1n1}$ | $f_{2n2}$ | ... | $f_{100n3}$ | $T_{n4}$ | $U_{n5}$ | $S_{n6}$ | $P_{n7}$ |

Referring to Table 1, in the dedicated operating parameter data set of the mining machine with 100 hash chips, first operating parameters of the mining machine are: the frequency of the first hash chip is $f_{11}$, the frequency of the second hash chip is $f_{21}$, ..., the frequency of the $100^{th}$ hash chip is $f_{1001}$, the temperature of the hashboard is $T_1$, the power supply output voltage is $U_1$, the computing power of the mining machine is $S_1$, and the power of the mining machine is $P_1$. Second operating parameters of the mining machine are: the frequency of the first hash chip is $f_{12}$, the frequency of the second hash chip is $f_{21}$, ..., the frequency of the $100^{th}$ hash chip is $f_{1001}$, the temperature of the hashboard is $T_1$, the power supply output voltage is $U_1$, the computing power of the mining machine is $S_2$, and the power of the mining machine is $P_2$. The rest can be deduced by analogy. In Table 1, letters i and n in subscript are only used to represent serial numbers of parameters to which they belong in combination with the parameters, where a value of i is, for example, an integer greater than 1, and n is combined with the following number to indicate a serial number of a obtaining the universal optimization configuration parameters by using the universal operating parameter model.

In some embodiments, the universal operating parameter model is obtained by using the following method:

forming operating parameters of a plurality of data processing devices into a universal operating parameter data set; and by using the universal operating parameter data set, executing model training, to obtain the universal operating parameter model, where the operating parameters include configuration parameters and capability parameters of the data processing device when the data processing device is operating under the configuration parameters.

In some embodiments, the obtaining the universal optimization configuration parameters by using the universal operating parameter model includes:

traversing values of the configuration parameters in the universal operating parameter model, to obtain the configuration parameters corresponding to the optimal capability parameters, and taking the configuration parameters corresponding to the optimal capability parameters as the universal optimization configuration parameters of the data processing device.

In some embodiments, using the data processing device being a mining machine as an example, it is assumed that, a universal operating parameter data set of the mining machine includes operating parameters of 1000 mining machines, and each mining machine includes 100 hash chips. For details of the universal operating parameter data set of the mining machine, refer to Table 2.

TABLE 2

|  | Frequency of a first hash chip | Frequency of a second hash chip | ... | Frequency of a 100$^{th}$ hash chip | Temperature of a hashboard | Power supply output voltage | Capability parameter | |
|---|---|---|---|---|---|---|---|---|
|  |  |  |  |  |  |  | Computing power | Power |
| Mining machine 1 | $f_{a11}$ | $f_{a12}$ | ... | $f_{a1100}$ | $T_{a1}$ | $U_{a1}$ | $S_{a1}$ | $P_{a1}$ |
| Mining machine 2 | $f_{a21}$ | $f_{a2}2$ | ... | $f_{a2100}$ | $T_{a2}$ | $U_{a2}$ | $S_{a2}$ | $P_{a2}$ |
| ... | ... | ... | ...... | ... | ... | ... | ... |
| Mining machine 1000 | $f_{a10001}$ | $f_{a10002}$ | ... | $f_{a1000100}$ | $T_{a1000}$ | $U_{a1000}$ | $S_{a1000}$ | $P_{a1000}$ |

Referring to Table 2, the operating parameters of any mining machine (a j$^{th}$ mining machine) of the 1000 mining machines are: the frequency of any hash chip is $f_{jk}$, the temperature of the hashboard is $T_j$, the power supply output voltage is $U_j$, the computing power of the mining machine is $S_j$, and the power of the mining machine is $P_j$, where, j represents any one of the 1000 mining machines. For example, j can represent a row number recorded in any row in Table 2, and a value of j is, for example, from 1 to 1000; and k represents a k$^{th}$ hash chip in the any mining machine (the j$^{th}$ mining machine), and a value of k is, for example, from 1 to 100. For example, in Table 2, $f_{a1000100}$ represents the frequency of a 100$^{th}$ hash chip in a 1000$^{th}$ mining machine. In Table 2, a is only used to distinguish it from the parameters in the foregoing table of the dedicated operating parameter data set of the mining machine.

In the method for determining configuration parameters of a data processing device in this embodiment of this application, the data processing device is operated first by using universal optimization configuration parameters of the data processing device, so that the data processing device can operate around the configuration parameters with computing power close to the optimal computing power. Based on this, during the operating process of the data processing device, the configuration parameters of the data processing device are changed to obtain a dedicated operating parameter data set of the data processing device, to obtain the dedicated data set that is applicable to the data processing device itself and can be used for model training. Based on this, the dedicated operating parameter model applicable to the data processing device itself can be obtained by using the dedicated operating parameter data set of the data processing device to execute model training, and the optimal configuration parameters targeted at the data processing device itself can be obtained by using the dedicated operating parameter model. In this embodiment of this application, the data set and the model training are used to obtain the optimal configuration parameters targeted at the data processing device itself and capable of realizing the optimal computing power, thereby realizing adaptive learning of the optimal configuration parameters of the data processing device, effectively avoiding a waste of the computing power of the data processing device, and improving the total computing power of the data processing device.

In addition, in the method for determining configuration parameters of the data processing device according to the embodiments of this application, the universal optimization configuration parameters of the data processing device is obtained by using a universal operating parameter model for the data processing device, and the universal operating parameter model for the data processing device is obtained by training a universal operating parameter data set of the data processing device composed of operating parameters of a plurality of data processing devices. Therefore, the universal optimization configuration parameters of the data processing device first used are more universal, so that the universal optimization configuration parameters initially configured for the data processing device can be close to the optimal configuration parameters of the data processing device itself. In this way, the number of samples in the dedicated operating parameter data set required for obtaining the dedicated operating parameter model for the data processing device can be reduced, time for training the dedicated operating parameter model can be saved, time for obtaining the optimal configuration parameters of the data processing device can be shortened, and efficiency of obtaining the optimal configuration parameters of the data processing device can be improved.

The embodiments of this application further provide a non-volatile computer-readable storage medium, where the non-volatile computer-readable storage medium stores instructions, and the instructions, when executed by a processor, cause the processor to perform the steps of the method for determining configuration parameters of a data processing device described above.

Figure 2:
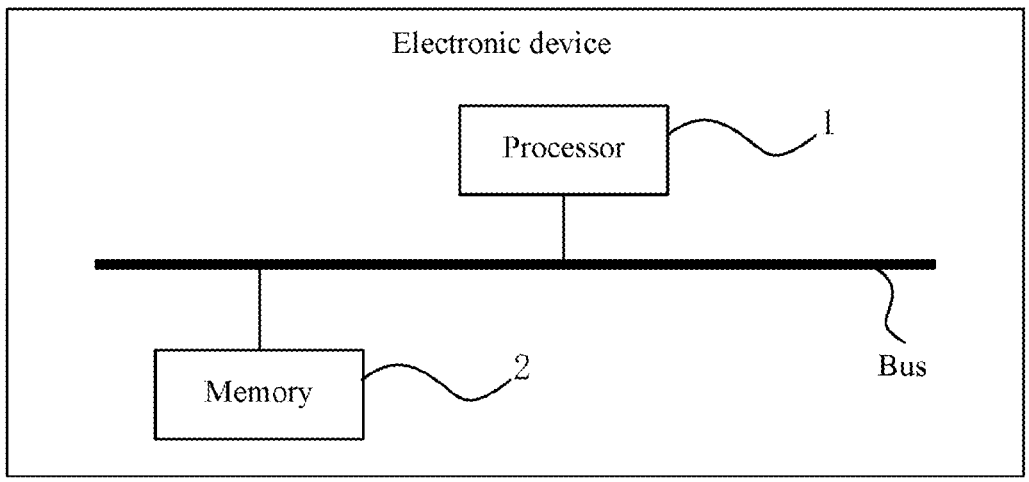
FIG. 2 is a schematic structural diagram of an electronic device according to an embodiment of this application.

The embodiments of this application further provide an electronic device for executing a method for determining configuration parameters of a data processing device. Referring to FIG. 2, the electronic device includes: at least one processor 1 and a memory 2. The memory 2 is communicatively connected to the at least one processor 1, for example, the memory 2 and the at least one processor 1 are connected through a bus. The memory 2 stores instructions executable by the at least one processor 1, and the instructions are executed by the at least one processor 1, to cause the at least one processor 1 to perform the steps of the method for determining configuration parameters of a data processing device described above.

The foregoing descriptions are merely some embodiments of this application, but are not intended to limit the present disclosure. Any modification, equivalent replacement, or improvement made within the spirit and principle of this application shall fall within the protection scope of this application.

What is claimed is:

1. A method for determining configuration parameters of a data processing device, comprising:
   operating the data processing device by using configuration parameters, wherein the configuration parameters are initially configured as universal optimization configuration parameters obtained according to a universal operating parameter model;
   during the operating process of the data processing device, changing the configuration parameters of the data processing device to obtain a dedicated operating parameter data set of the data processing device, wherein the operating parameter dedicated data set comprises a plurality of groups of operating parameters, and each group of operating parameters comprises configuration parameters and capability parameters of the data processing device when the data processing device is operating under the configuration parameters;
   executing model training by using the dedicated operating parameter data set to obtain a dedicated operating parameter model for the data processing device; and
   obtaining optimal configuration parameters of the data processing device according to the dedicated operating parameter model, and operating the data processing device according to the optimal configuration parameters, wherein the optimal configuration parameters are configuration parameters corresponding to optimal capability parameters in the dedicated operating parameter data set, wherein the capability parameters include the computing power of the data processing device and the power of the data processing device.

2. The method according to claim 1, wherein
   the configuration parameters comprise: a frequency of each hash chip, a temperature of a hashboard, and a power supply output voltage of the data processing device.

3. The method according to claim 2, wherein said changing the configuration parameters of the data processing device to obtain the dedicated operating parameter data set of the data processing device comprises:
   changing the frequency of the each hash chip, the temperature of the hashboard, and/or the power supply output voltage of the data processing device, to obtain capability parameters of the data processing device under different configuration parameters, forming the operating parameters with the configuration parameters and the capability parameters of the data processing device corresponding to the configuration parameters, and forming the dedicated operating parameter data set of the data processing device with the plurality of groups of operating parameters.

4. The method according to claim 1, wherein said obtaining the optimal configuration parameters of the data processing device according to the dedicated operating parameter model for the data processing device comprises:
   by using the dedicated operating parameter model for the data processing device, traversing values of the configuration parameters to obtain the configuration parameters corresponding to the optimal capability parameters in the dedicated operating parameter data set, and taking the configuration parameters corresponding to the optimal capability parameters as the optimal configuration parameters of the data processing device.

5. The method according to claim 1, further comprising:
   obtaining the universal optimization configuration parameters by using the universal operating parameter model for the data processing device.

6. The method according to claim 5, wherein the universal operating parameter model is obtained by using the following method:
   forming operating parameters of a plurality of data processing devices into a universal operating parameter data set; and
   executing model training by using the universal operating parameter data set, to obtain the universal operating parameter model, wherein
   the operating parameters comprise configuration parameters of each data processing device and capability parameters of the data processing device when the data processing device is operating under the configuration parameters.

7. The method according to claim 6, wherein said obtaining the universal optimization configuration parameters by using the universal operating parameter model comprises:
   by using the universal operating parameter model, traversing values of the configuration parameters in the universal operating parameter model to obtain the configuration parameters corresponding to the optimal capability parameters in the universal operating parameter model, and taking the configuration parameters corresponding to the optimal capability parameters as the universal optimization configuration parameters of the data processing device.

8. A non-volatile computer-readable storage medium, storing instructions, wherein the instructions, when executed by a processor, cause the processor to perform the steps of the method for determining configuration parameters of a data processing device according to claim 1.

9. An electronic device, comprising:
   at least one processor; and
   a memory communicatively connected to the at least one processor, wherein
   the memory stores instructions executable by the at least one processor, and the instructions are executed by the at least one processor, to cause the at least one processor to perform the steps of the method for determining configuration parameters of a data processing device according to claim 1.

* * * * *